D. Niven.
Potato Digger.
N° 28,294. Patented May 15, 1860.
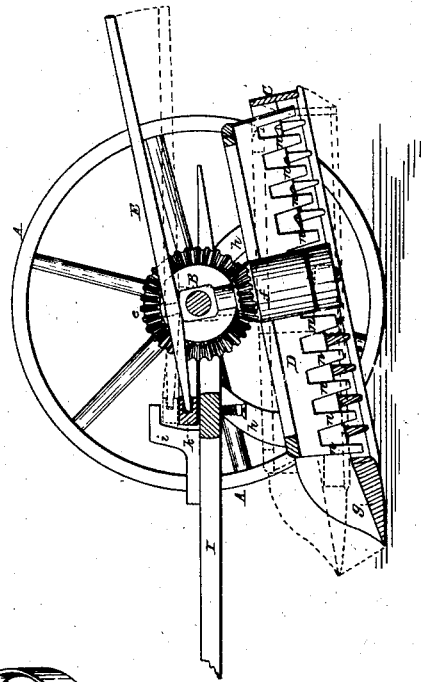
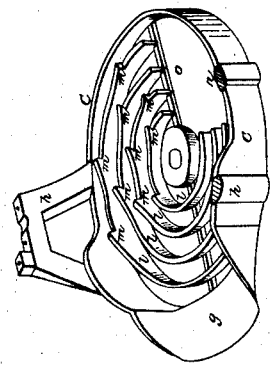
Witnesses:
J. Strasen
R. F. Taylor
Inventor:
David Niven

UNITED STATES PATENT OFFICE.

DAVID NIVEN, OF ROCHESTER, NEW YORK.

IMPROVEMENT IN POTATO-DIGGERS.

Specification forming part of Letters Patent No. 28,294, dated May 15, 1860.

*To all whom it may concern:*

Be it known that I, DAVID NIVEN, of Rochester, in the county of Monroe and State of New York, have invented certain new and useful Improvements in Machines for Digging Potatoes; and I do hereby declare that the following is a full and exact description thereof, reference being had to the accompanying drawings, in which—

Figure 1 is a vertical longitudinal section of my improved machine; Fig. 2, a detached perspective view of the grate, share, and bail; and Fig. 3, a section of a portion of the riddle, showing the construction of the bars $l$.

Similar letters refer to corresponding parts in all of the figures.

In general construction my machine consists of a pair of truck-wheels, one of which, A, is represented in Fig. 1, from the axle of which, B, a suspended grating, C, Fig. 2, is hung by a bail on each side, and upon which also hangs a toothed clearing-wheel, D, driven by the beveled wheel and pinion $e\ f$, the former of which is fastened upon the axle.

The share $g$ forms an extension of the outer frame of the riddle, which is constructed of cast-iron, with a steel edge or plate attached to form the share. The bails $h$, one of which is removed in Fig. 2, are attached by bolts or otherwise, so as to form a part of the riddle, and are held by boxes of ordinary construction to the axle B, and turn freely on it. Their forward arms are longer than the others, by which the grate hangs with the share at or near the surface of the ground, and the surface of the grate rises therefrom by a gradual inclination. A yoke-frame, $k$, is attached to the bails at each bearing, and extends across in front of the axle and above the draft pole or tongue I.

The shaft of the clearing-wheel D, which is attached to the axle B, has an extended portion directly above the latter, which passes through a socket in the hand-lever E, the short arm of which enters a mortise in the yoke $k$, and the long arm extends back of the rear of the machine, and is held by the hand of the driver. By depressing this lever the share is immediately thrown out of the ground, as indicated by the dotted lines in Fig. 1, enabling the operator to avoid stones and other obstacles, and also to graduate the depth of the share and accommodate it to the varying surface of the ground. The grate, being nearly balanced in its swivel-bearings in the axle B, turns with ease by the aid of the lever E, the motion of which is reasonably limited by the guard $i$ on the tongue. This arrangement makes the guiding of the share a work of the greatest ease, and it is highly essential to the successful operation of the machine, as it prevents the necessity of taking any more dirt than is actually necessary to secure the tubers, and thus saves clogging the machine and unnecessary labor of the team.

The bars $l\ l$ of the grate are concentric around the shaft of the clearing-wheel, and are placed so close to each other as only to allow the dirt to pass through them, the potatoes being carried around and dropped through the opening O left for that purpose. Their upper edges are serrated or formed with series of inclined planes $m$, Figs. 2 and 3, over which the dirt and tubers are carried. The inclines terminate abruptly, and the disturbance produced is so great as to separate the earth entirely when sufficiently dry for the operation, it falling through the bars, while the potatoes are discharged in a row through the opening and left on the surface of the ground.

The arms of the clearing-wheel are provided with teeth $n$, like those of a comb, which pass through the interstices, or at least considerably below the surface of the bars $l$, sweeping everything which is carried onto the surface of the grate around to the point of discharge, and preventing any accumulation of damp earth or vines between the bars.

The surface of the grate is on a line with that of the share, so that the hill or earth slides easily onto the riddle. The draft-pole I is attached directly to the axle by swivel-journals, and thus the operating parts—viz., the share, riddle, and clearing-wheel—are all capable of adjustment by the lever E with slight friction, and without any complex arrangements of frame or other encumbrances.

The truck-wheels are provided with ratchet-fastenings on the axles to admit of turning around without driving the clearing-wheel.

I am aware that shares, riddles, and rotating clearers of various forms of construction have been used for digging and separating potatoes, and such merely, either separately or in combination, I do not claim.

What I claim as my invention, and desire to secure by Letters Patent, is—

1. Suspending the grate, share, and clearing-wheel together upon the axle of the supporting-wheels by means of the bails $h\ h$, yoke $k$, and axis of said clearing-wheel, as described, or by their equivalents, in combination with a lever, E, so that the said grate, share, and clearing-wheel may be continually graduated by the attendant to any depth, and adjusted to the undulations of the ground, or raised therefrom independently of the movements of the other parts of the machine, as herein specified.

2. Forming the upper surface of the circular concentric grate-bars $l$ with serrated edges $m\ m$, in combination with the intervening teeth $n\ n$ of the clearing-wheel, for the more effectual separation of the tubers from the earth, substantially as set forth.

DAVID NIVEN.

Witnesses:
J. FRASER,
R. F. TAYLOR.